March 16, 1926. 1,577,065
H. E. FULLER
LAWN BROOM
Filed Feb. 25, 1924 3 Sheets-Sheet 3
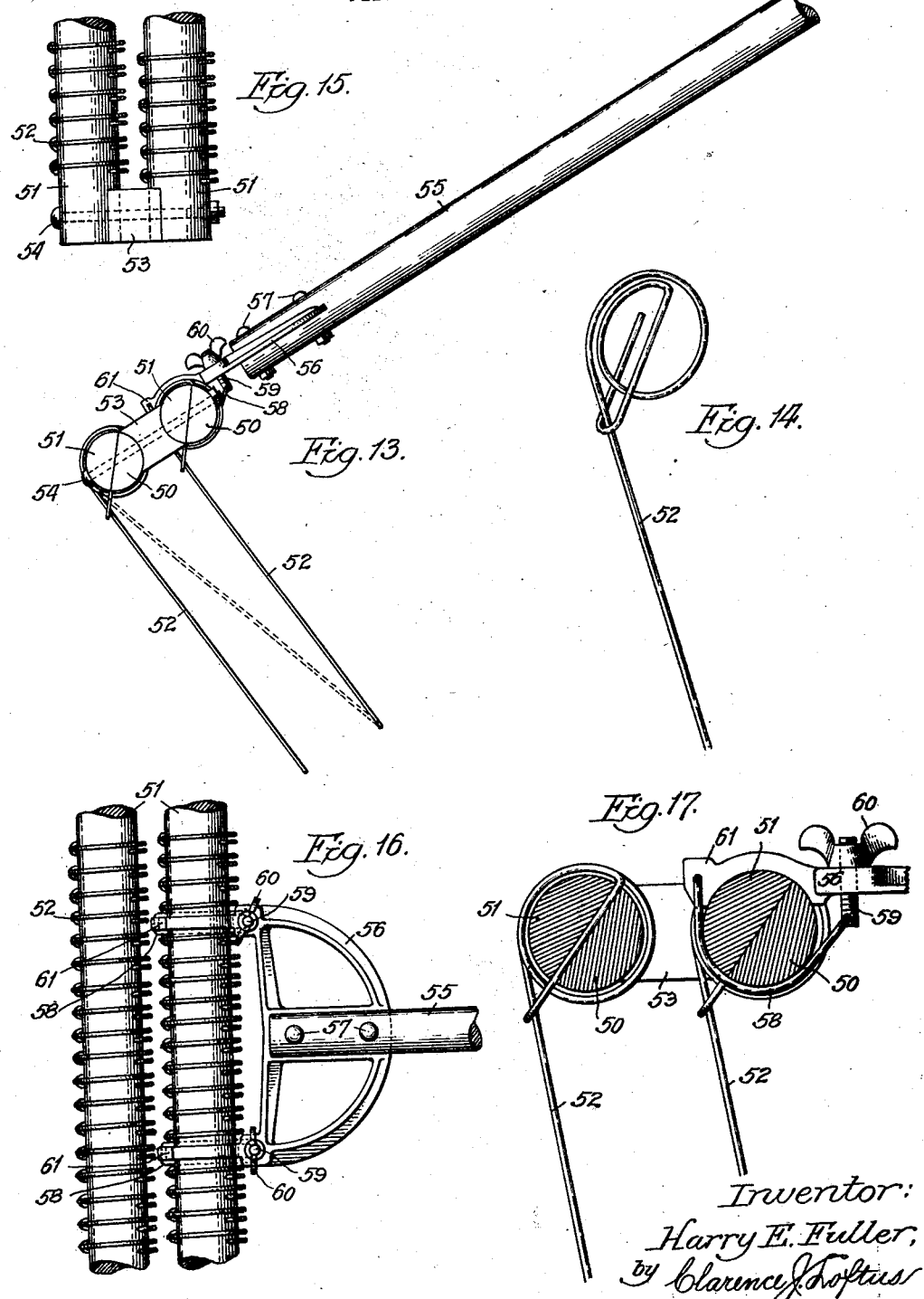

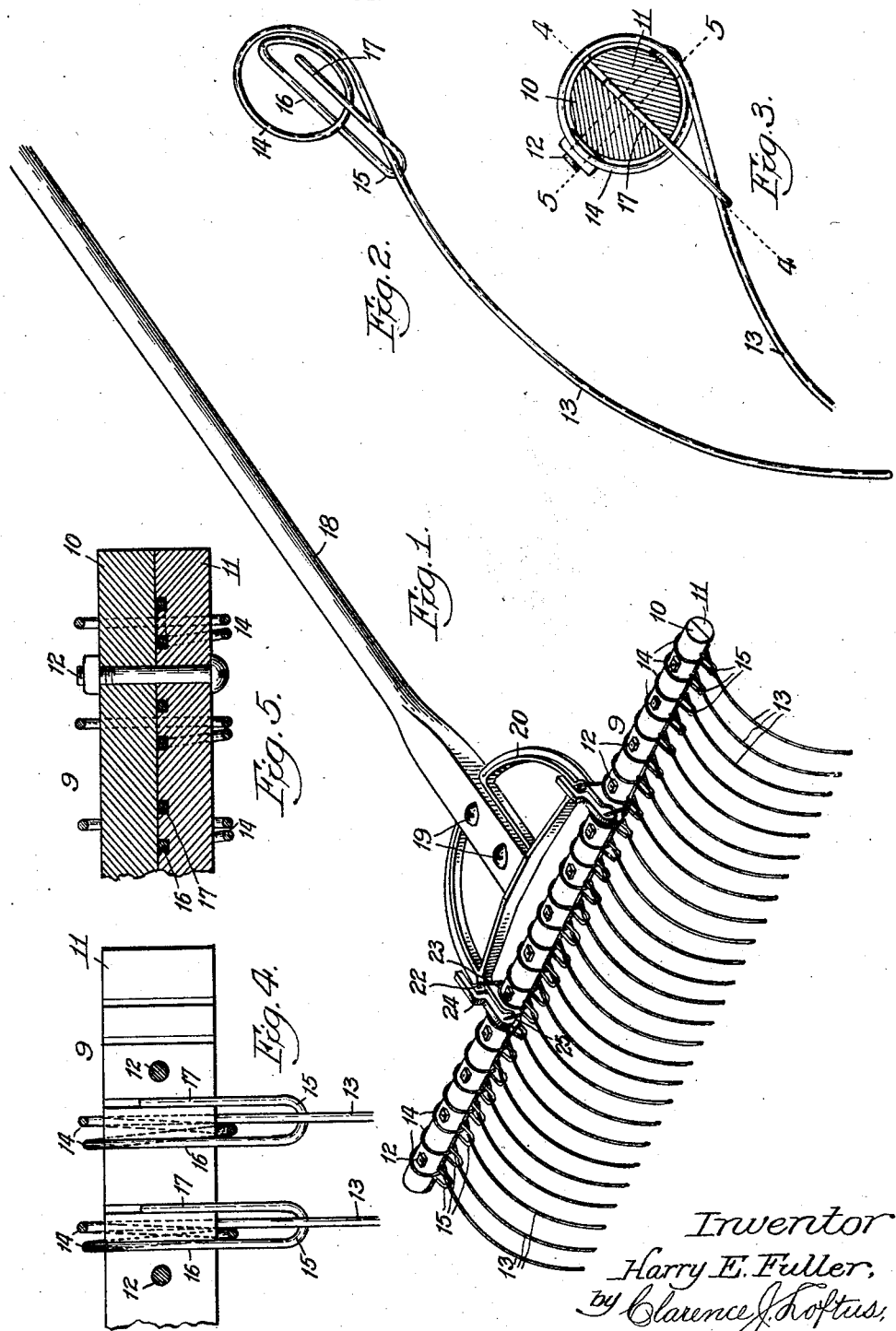

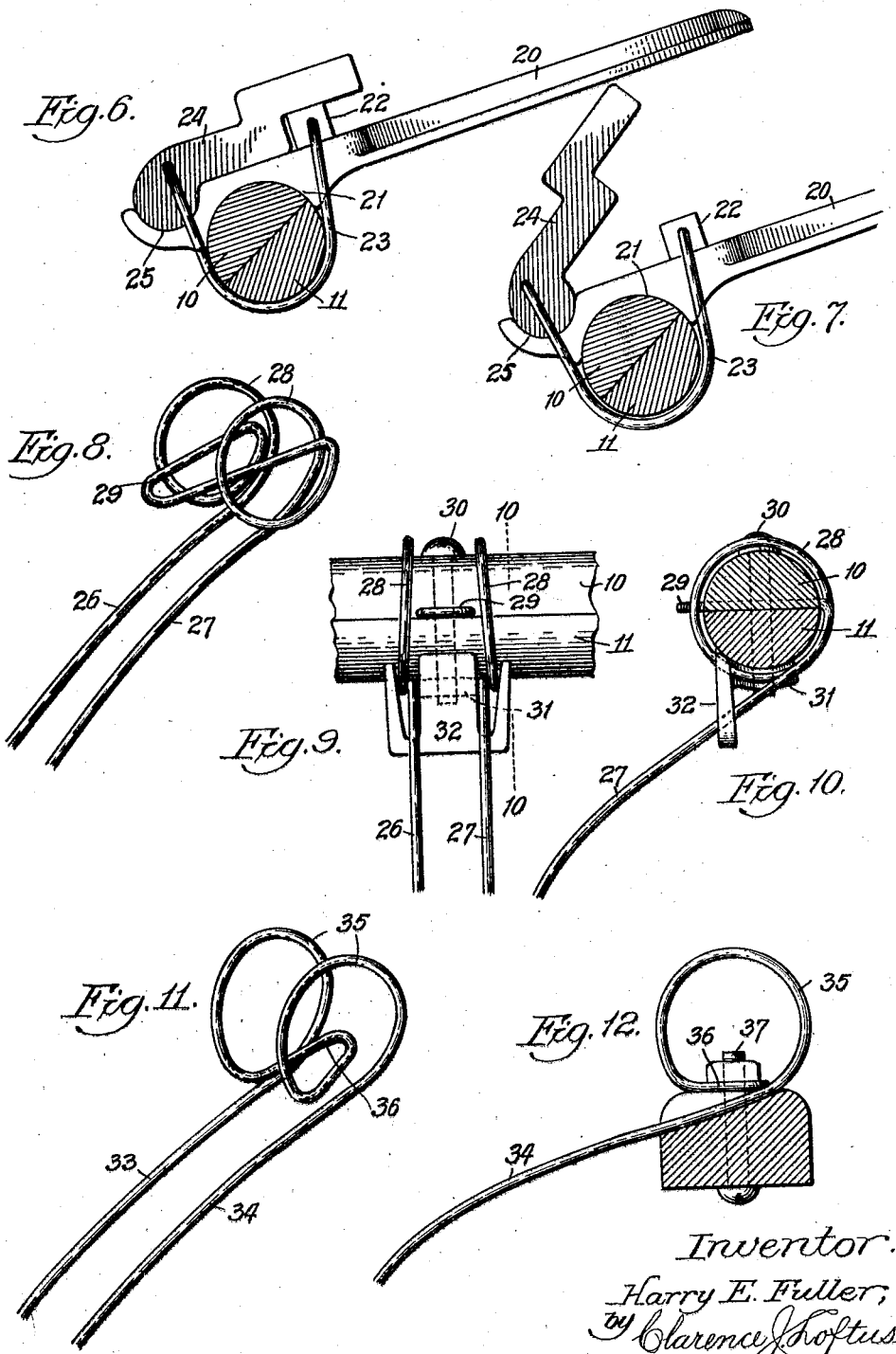

Patented Mar. 16, 1926.

1,577,065

UNITED STATES PATENT OFFICE.

HARRY E. FULLER, OF NEWHALL, IOWA.

LAWN BROOM.

Application filed February 25, 1924. Serial No. 694,874.

*To all whom it may concern:*

Be it known that I, HARRY E. FULLER, residing at Newhall, in the county of Benton and State of Iowa, have invented a certain new and useful Lawn Broom.

It is an object of my invention to provide a device of this class of light, efficient, durable and inexpensive construction, particularly adapted for use in raking and sweeping lawns and the like.

It is a further object to provide a rake of this type with the teeth thereof so shaped, formed and constructed that the rake can be readily and quickly cleaned by simply giving a reverse sweeping swing.

It is a further object to provide such a rake which can be readily and quickly knocked down for shipment in a small compact package and readily and quickly assembled at the place where used.

It is a further object to provide improved means whereby the position or angle of the teeth with respect to the handle can be readily and quickly changed or adjusted when desired.

It is a further object to provide improved means for attaching the handle to the rake frame.

It is a further object to provide in a device of this class a series of teeth constructed of camparatively small wire and so mounted and formed and constructed as to afford a wide range of movement under spring tension.

It is a further object to provide a bumper or "kick-off" for such teeth which will limit the inward movement thereof and tend to automatically clean the teeth.

The above and other features of novelty, advantages and capabilities will become apparent from a detailed description of the accompanying drawings in which I have illustrated constructions embodying different forms of my invention, but the constructions there shown are to be understood as illustrative only and not as defining the limits of my invention.

Figure 1 is a perspective view of a combined lawn broom and brush embodying one form of my invention showing a portion of the handle broken away.

Fig. 2 is an enlarged detailed perspective view illustrating the construction of the teeth shown in Fig. 1.

Fig. 3 is a sectional view illustrating the manner of mounting the teeth in place on the rake frame, the frame being shown in cross section.

Fig. 4 is a view taken substantially on the line 4—4 of Fig. 3.

Fig. 5 is a sectional view taken on the line 5—5 of Fig. 3 with the securing bolt shown in elevation.

Fig. 6 is an enlarged elevational view of the handle yoke and means for securing it to the rake frame with the latter shown in section.

Fig. 7 is a similar view with the locking lever for the fastening means in an open position.

Fig. 8 is an enlarged perspective view of a modified form showing a double tooth.

Fig. 9 is a view showing the same tooth applied to the rake frame with the "kick-off" or bumper secured in place.

Fig. 10 is a vertical sectional view taken substantially on the line 10—10 of Fig. 9.

Fig. 11 is a perspective view of a further modified form showing a double tooth.

Fig. 12 is an elevational view of the teeth shown in Fig. 11 as applied to the rake frame.

Fig. 13 is a side elevational view of a further modified form showing the teeth slightly modified and incorporated in a brush which is peculiarly adapted for use in brushing floors, pavements, streets and the like, and further illustrating a modified means for readily and quickly attaching and detaching the handle to and from the brush frame.

Fig. 14 is an enlarged perspective view of the teeth shown in Fig. 13.

Fig. 15 is a top plan view of a portion of the brush.

Fig. 16 is a similar view showing the handle attached, and

Fig. 17 is a vertical sectional view taken substantially on the line 17—17 of Fig. 16 with the handle frame broken away.

Referring to the modification shown in the first seven figures of the drawings, I have illustrated the preferred form of my invention. The frame 9 in which the teeth are mounted comprises upper and lower half-round members 10 and 11. In the illustrations shown, the lower member 11 is provided with suitable grooves spaced apart for receiving and spacing the inner ends of the spring teeth presently to be described.

These teeth are constructed of a single piece of spring-like wire of comparatively small gauge, and are so formed as to provide an arc-shaped raking and sweeping portion 13, with the inner end formed into a coil 14 having a substantially larger diameter than the frame 9 and adapted to encircle the rake frame. The free end of the coil 14 is bent backwardly at right angles substantially across the center of the coil, thence forwardly to form an integral U-shaped bumper or "kick-off" 15, through which the arc-shaped raking and sweeping portion of the teeth passes. The inner end portions 16 and 17 of the bumper or "kick-off" fit into suitable grooves in the lower member 11 and are tightly and detachably clamped between such member and the member 10 by means of the bolts and nuts shown. After the teeth have been bent into the desired shape they are then tempered and placed in position with respect to the member 11. The member 10 is then inserted through the spring coils of the teeth to the desired position and the securing bolts 12 are then inserted through the aligned openings in the two members for drawing them tightly together.

From this it will be seen that my improved teeth inherently possess a high degree of spring action and are so mounted as to obviate any likelihood of being bent out of shape to such an extent as not to be capable of returning to their normal position when in practical use, for when an abnormal strain is imposed on the teeth in use, they can because of their inherent construction and advantages swing upwardly to a position at almost right angles to their normal position, thus permitting the rake to pass over obstructions, and the like, and the moment such obstruction is passed, snap back to their normal position, without taking a set or in any wise lessening their usefulness for their intended purpose. This action is due, largely, to the fact that the coil spring portion encircling the frame 9 being of a considerably larger diameter than the frame permits the teeth to swing upwardly until the coil spring is closed sufficiently to tightly grip the frame, thus affording a wide range of movement to the teeth without any danger of impairing the spring action thereof. It will also be understood that when the teeth snap back to their normal position they are brought to a sudden stop by the bumper of "kick-off" 15, which causes the outer ends of the teeth to vibrate violently, thus automatically cleaning them from material collected thereon.

The handle 18 which may be of any desired length is detachably secured by means of the bolts 19 to the yoke 20. This yoke is provided at each end on its underside with bearings 21 adapted to fit over the frame 9 between a pair of teeth. For detachably and adjustably securing the frame 9 in the bearings of this yoke I provided the angular block 22, positioned on the upper side of the yoke. This block has an opening off center through which is looped a wire or cable 23. This cable passes down, under and around the frame 9 and through an opening in the eccentric locking lever 24. This lever is provided with a cam-like nose adapted to cooperate with the bearing 26 formed in the upper outer end of the yoke. When the lever 24 is in the position shown in Figure 6, the yoke, is firmly and tightly locked to the frame 9. In Fig. 7 the locking lever 24 is shown in a partly open position. It will readily be seen that with this arrangement the yoke can be locked or fastened to the frame 9 at any desired angle or position. By passing the cable or wire through the opening in the block 22, which is off center, and the securing means can be readily and quickly adjusted by turning the block to accommodate frames of various thicknesses and to compensate for slack which may develop from usage or expansion of parts. It will also be seen that the parts can be readily and quickly taken apart and knocked down and the entire structure shipped in a small compact package by parcel post or otherwise.

Referring to Figures 8, 9, and 10, I have shown a modified form of tooth. In this instance the structure comprises double teeth 26 and 27 which are provided on their ends with coil springs 28 and terminate in a U-shaped portion 29 extending at right angles across the coil springs substantially at the center thereof. This U-shaped member 29 is positioned between the members 10 and 11 of the frame and tightly clamped therebetween by means of a bolt 30 which passes down through the two members and the U-shaped member 29 with its lower end screwed into a flange 31 of the bumper or "kick-off" 32. This kick-off is provided with two grooves or slots to receive the teeth 26 and 27 and permit a wide range of movement therein. The action of this bumper or "kick-off" is quite similar to the one explained in the first seven figures.

In Figures 11 and 12 I have shown a further modification which comprises two teeth 33 and 34 formed from a single piece of spring-like wire of comparatively small gauge and provided at their inner ends with coil, spring portions 35, terminating in a flat U-shaped member 36. This tooth is used in connection with a single piece frame having a flat upper surface and is secured thereto by means of the bolt 37 which passes through the frame and U-shaped member 36. In this form, in order to permit a wide range of movement under spring tension, the frame is provided with suitable grooves adapted to receive the teeth, 33 and 34, one of which grooves is shown in Figure 12.

Referring to the modification illustrated by Figs. 13 to 17 inclusive, my brush in practical use will comprise one or more banks or rows of teeth (I have illustrated two in the drawings), each row being mounted in a frame member with the frame members spaced apart and connected one to another in any suitable manner, for example by means of the bolts shown. In the form shown, the brush comprises two frame members, each member consisting of two half rounds, 50 and 51, between each pair of which are tightly clamped teeth 52. These teeth are constructed of comparatively small spring wire, preferably of 14 gauge, and they are substantially identical with the teeth shown in Figs. 2 and 3 heretofore described, except they extend outwardly from the brush frame at substantially right angles, instead of in the form of an arc as shown in Figs. 1, 2 and 3. The two frame members are spaced apart at each end by means of a block 53, and are held together and against such block by means of a bolt 54.

The handle 55 is detachably secured to the yoke 56 by means of bolts 57. This yoke at either end is provided with a suitable bearing adapted to fit over one of the frame members. For detachably and adjustably securing the yoke to the frame, I provide a loop 58 of small wire which passes through an opening in a screw-threaded adjusting bolt 59, which bolt passes through a suitable opening in the yoke 56 and is provided at a separate end with an adjustable thumb screw 60 for adjusting the bolt. The loop 58 passes down around the frame and through an opening in the outer end of the bearing arm 61. From this it will be seen that the handle can be readily and quickly secured to the brush frame at any desired position or angle. It will also be seen that I have provided a brush arrangement so formed and constructed as to efficiently brush uneven or roughened surfaces as the teeth at all times between their limit of movement exert a spring tension action on the surface or article with which they contact.

Having thus described my invention I claim:

In a lawn broom and rake, the combination of a frame consisting of a plurality of complementary members, a series of spring teeth each tooth being integrally provided with a spring coil encircling said frame members and normally out of engagement therewith, a U-shaped loop formed on the inner end of said coil having a portion thereof clamped between said complementary members for securing the tooth in place with the closed end of said loop extending outwardly from said frame and encircling the teeth whereby said teeth are permitted a wide range of movement in all directions under abnormal strains, and are returned to their normal position when said strains are released, substantially as and for the purpose set forth.

In witness whereof, I have hereunto subscribed my name to this specification.

HARRY E. FULLER.